May 20, 1924.
C. E. BENNETT
CURRENT INTERRUPTER
Filed May 18, 1920
1,494,945
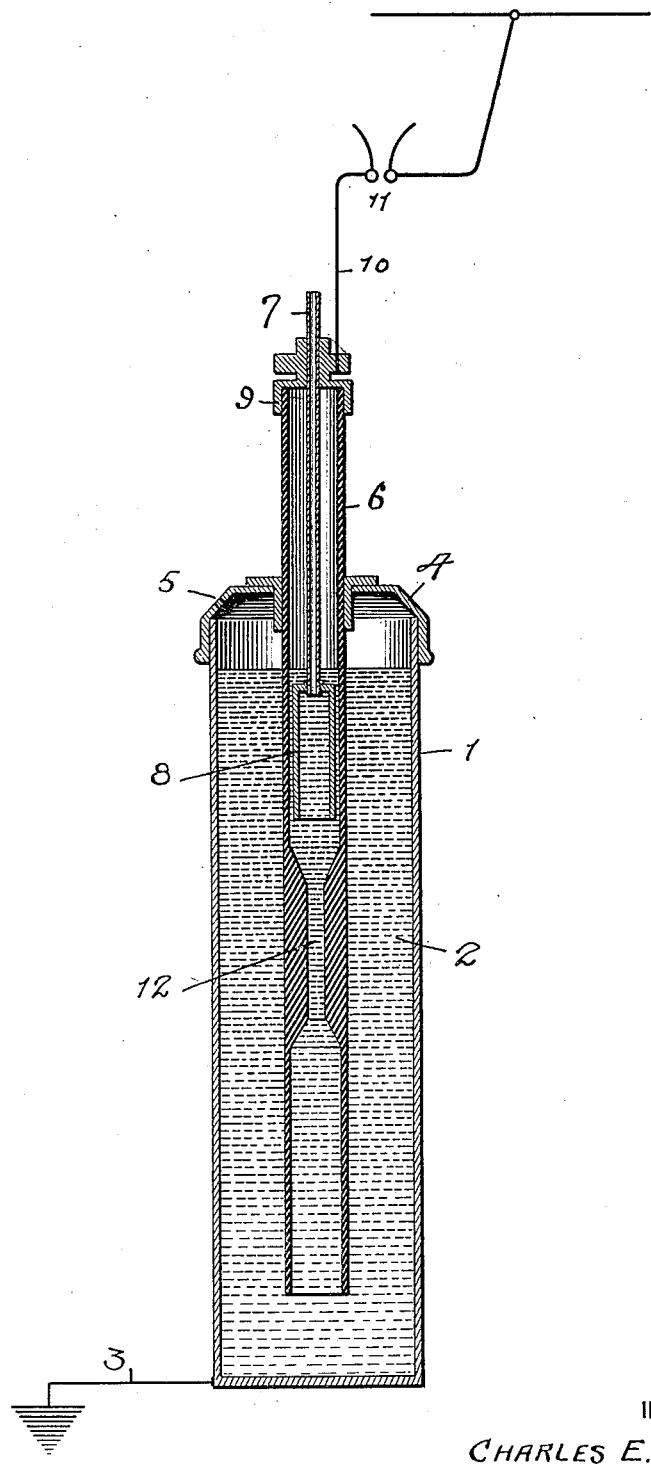
INVENTOR
CHARLES E. BENNETT
BY
ATTORNEYS Patented May 20, 1924.

1,494,945

UNITED STATES PATENT OFFICE.

CHARLES E. BENNETT, OF ATLANTA, GEORGIA, ASSIGNOR, BY MESNE ASSIGNMENTS, TO BALT MANUFACTURING COMPANY, OF ATLANTA, GEORGIA, A CORPORATION OF GEORGIA.

CURRENT INTERRUPTER.

Application filed May 18, 1920. Serial No. 382,309.

*To all whom it may concern:*

Be it known that I, CHARLES E. BENNETT, a citizen of the United States of America, residing at Atlanta, in the county of Fulton and State of Georgia, have invented certain new and useful Improvements in Current Interrupters, of which the following is a specification.

My invention relates to automatic current interrupters, and particularly to a device of the general type shown in my copending application Ser. No. 306,383, filed June 24, 1919, for automatically interrupting a protective ground connection associated with a power line. The object of my invention is to further simplify and improve the apparatus by so constructing it that on the passage of predetermined current therethrough, portions of the electrolyte are separated into bodies of different polarity by the formation of an arc within the electrolyte, whereupon the arc plays between the separated portions of the electrolyte and is drawn out to the breaking point. This construction has the advantage of eliminating the necessity for a metallic electrode, in the proper sense of the word, and obviates the delicate adjustment of the electrode with relation to the electrolyte heretofore requisite to secure a hot spot contact between the same and the consequent instantaneous vaporization of the electrolyte on the flow of current through the interrupter.

In the accompanying drawing, I have shown in vertical section an interrupter in which my invention is embodied in one form.

While the invention is susceptible of embodiment to advantage in interrupters of many and entirely different types of construction from that illustrated, I have shown it applied to an established type comprising a reservoir 1, which may be of metal containing a readily vaporized electrolyte 2, such as water, which has a high heat absorbing capacity, while it is at the same time subject to variation of density and conductivity by the addition of salt or other constituent, which may also render it non-freezing under most atmospheric conditions. The electrolyte is grounded by a connection 3, which, when the reservoir is of metal, may be connected to the latter. To prevent vaporization of the electrolyte, the reservoir is preferably closed at the top by a cover 4, which may be slightly vented at 5.

Dipping into the electrolyte and conveniently supported by the cover 4, is a tube 6 of insulating material. A conductor 7 leads down through the tube into contact with the electrolyte rising therein, and is conveniently formed by a pipe carrying an enlarged terminal 8 to afford an extended area in contact with the electrolyte. The pipe is supported by a cap 9 at the head of the tube 6, and a line connection 10 is made thereto through a gap 11 of any sort, such as the diagrammatically illustrated horns.

It will be noted that instead of forming a hot spot contact between the terminal 8 and the electrolyte in the tube 6, the terminal is submerged so that the current flows freely to the electrolyte therethrough. This emphasizes the unimportance of the manner in which the current is led to the electrolyte in the tube, according to the present invention, it being requisite only that some means be provided for freely leading the current to the electrolyte in the upper portion of the tube.

Located at a suitable distance below the point at which current is led to the electrolyte in the tube, is a constricted passage 12. The length and diameter of this passage are predetermined in accordance with the current conditions on the line in which the interrupter is installed, although the operation of the interrupter is subject to further control by varying the density or nature of the electrolyte itself. The manner in which the passage 12 is formed within the tube is immaterial. While it may be built up by the insertion of an independent piece, or pieces, of insulating material suitably secured within the tube, I have shown it formed integral with the latter inasmuch as this prevents any possibility of the passage of the current except through the constricted channel 12.

This modification of the construction heretofore employed is productive of important practical and technical advantages. The path of the current through the interrupter is of course down the pipe 7 to the electrolyte in the upper portion of the tube 6, thence through the electrolyte in the constricted portion 12 to the electrolyte in the lower portion of the tube, and therefore to the main body of the electrolyte in the reservoir, and to ground through the lead 3. The cross-section of the constricted passage 12 is so predetermined, and the electrolyte of such conductivity, that upon the flow of predetermined current through the interrupter the electrolyte in the passage 12 is vaporized and an arc struck between the now separated bodies of electrolyte in the upper and lower portions of the tube. These upper and lower portions of electrolyte within the tube thus constitute electrodes for the arc, and the latter does not play upon the terminal 8 of the pipe 7. The construction of the latter does not need, therefore, to be designed to withstand arcing conditions. Nor is it at all requisite that the position of the terminal in the tube be accurately predetermined to maintain a hot spot contact area, it being only necessary that the current is led to the electrolyte in the upper portion of the tube, and this may be accomplished in many different ways. It is also a great practical advantage that variations in the level of the electrolyte in the tube become unimportant, even though these variations are substantial, since the terminal 8 may be located sufficiently far down in the tube to meet all practical conditions.

In addition to these features of improvement, the interrupter retains the merits of my previous construction, in that the tube 6 is cooled by the electrolyte in the reservoir, thus not only being itself preserved against injury through the heat of the arc, but also serving to chill and quench the arc. I have found that an interrupter of the present construction may be operated repeatedly in rapid succession without injury to the tube 6, or raising the temperature of the electrolyte to such an extent as to interfere with the operation of the interrupter. The venting of the upper portion of the tube 6 through the pipe 7 prevents excessive mechanical strain upon the tube, as in my previous construction. This pressure is apt to become dangerous, however, only when the line is subjected to such excessive current as results from a direct lightning stroke on the line. In such case the arc is so heavy and so rapid that the electrolyte is absolutely punctured. While the apparatus will withstand such a discharge, it is designed for and adjustable with considerable delicacy of action to take care of line surges which may not go far above the normal voltage of the line, but are nevertheless sufficient to arc across the gap 11.

As previously stated, I have shown the invention applied to an interrupter of established type. It will be obvious, however, to any one skilled in the art, that the underlying thought is susceptible of many different embodiments in practical apparatus. This underlying thought is to divide the electrolyte into two paths of low resistance interconnected by a path of high resistance, so that the current flows in series through the low, high and low resistance paths to ground on the operation of the interrupter. A further underlying thought is to so arrange the elements of the interrupter that upon the break of the arc which forms at the path of high resistance, the electrolyte from the paths of low resistance automatically reestablishes the path of high resistance by flowing into the constricted passageway. It is also a practical essential to submerge, or otherwise water cool, this constricted passageway not only to preserve the tube against heat injury, but also to assist in cooling and thus quenching the arc. It is possible to dispense with one or the other of the paths of low resistance, but I prefer to so construct the arrester that the arc is formed between two water terminals—thus avoiding the necessity for any metallic electrodes. It is not essential that the constricted passage be of a length at least equal to that of the breaking length of the arc, but I prefer to have it approach this length.

From the foregoing it is obvious that the invention may be embodied in various forms of construction, and I do not limit my claim of invention to the illustrative embodiment particularly shown and described.

I claim:

1. In a protective installation for electrical apparatus, a container, a conducting electrolyte within the container, a hollow member at least partially submerged in and opening to the electrolyte in the container, said member having a constricted passageway normally occupied by the electrolyte entering the hollow member from the container, together with means preventing a discharge through the installation under normal conditions, a conductor in series circuit relation with the electrolyte in said hollow member and so arranged with respect to the constricted passageway therein as to cause the current to flow through the electrolyte in said passageway on the discharge through the apparatus under abnormal line conditions, said constricted passageway being of such dimensions and the electrolyte of such character that on said discharge the electrolyte is vaporized and an arc drawn in said passageway.

2. In a device of the class described, a container, a conducting fluid within the container, a hollow member at least partially submerged in and opening to the fluid in the container, said member having a constricted passageway normally occupied by the fluid entering the hollow member from the container, together with an arc gap and a conductor in series circuit relation therewith and with the fluid in said hollow member and so arranged with respect to the constricted passageway therein as to cause the current to flow through the fluid in said passageway, on discharge through the circuit, said constricted passageway of such dimensions and the fluid of such character that on said discharge the fluid is vaporized and an arc drawn in said passageway, said constricted passageway in the hollow member being arranged below the fluid level in the container.

3. In a protective installation for power lines, a normally open ground connection comprising a container, a readily vaporizing electrolyte within the container, an insulating tube dipping into the electrolyte in the container, said tube having a constricted passageway below the level of the electrolyte, a conductor in series circuit relation with the electrolyte rising in said insulating tube from the container and so arranged with respect to the constricted passageway therein as to cause the current to flow through the electrolyte in said passageway on discharge through the ground connection, said constricted passageway being of such dimensions and the electrolyte of such character that on said discharge the electrolyte is vaporized and an arc formed in said passageway.

4. In a device of the class described, a container, a conducting fluid within the container, an insulating member at least partially submerged in said fluid in the container, and having in said submerged portion a constricted passage open to the fluid in the container, and means in series circuit relation with the fluid in said passage for leading current to the fluid, said passage being of a predetermined length sufficient to cause the fluid in said constricted passage to be vaporized on a discharge through the circuit, and to draw an arc between portions of the fluid, said arc being of sufficient length to cause an interruption of the circuit.

5. In a device of the class described, a container, a conducting fluid within the container, a tube passing through the tube of the container and dipping into said fluid, said tube being open to the fluid at its lower end and having a constricted passageway within the submerged portion of the tube, in combination with an electrode in series circuit relation with the fluid arising in said tube above the constricted passageway, said passageway being of a length exceeding the diameter of the tube, and of sufficient extent to cause vaporization of the fluid on a discharge through the circuit and the formation of an arc of a length sufficient to cause the interruption of the circuit.

6. The method of interrupting flow of current through a protective ground connection for power lines which consists in causing current to flow across a gap in the protective ground connection and through a vaporizable electrolyte in series with said gap, confining the current flow at one point in its passage through the electrolyte to a portion of the electrolyte of relatively slight cross section, causing the current to vaporize the electrolyte during the passage of the current through said area of relatively slight cross section, and causing portions of the electrolyte at opposite ends of said area of slight cross section to be displaced in opposite directions by said vapor, confining the displaced electrolyte and vapor against rapid escape and thus interposing in the protective ground connection the cumulative resistance of the gap and vapor under pressure to the flow of the current through said ground connection.

In testimony whereof I have signed my name to this specification.

CHARLES E. BENNETT.